Figure 1:
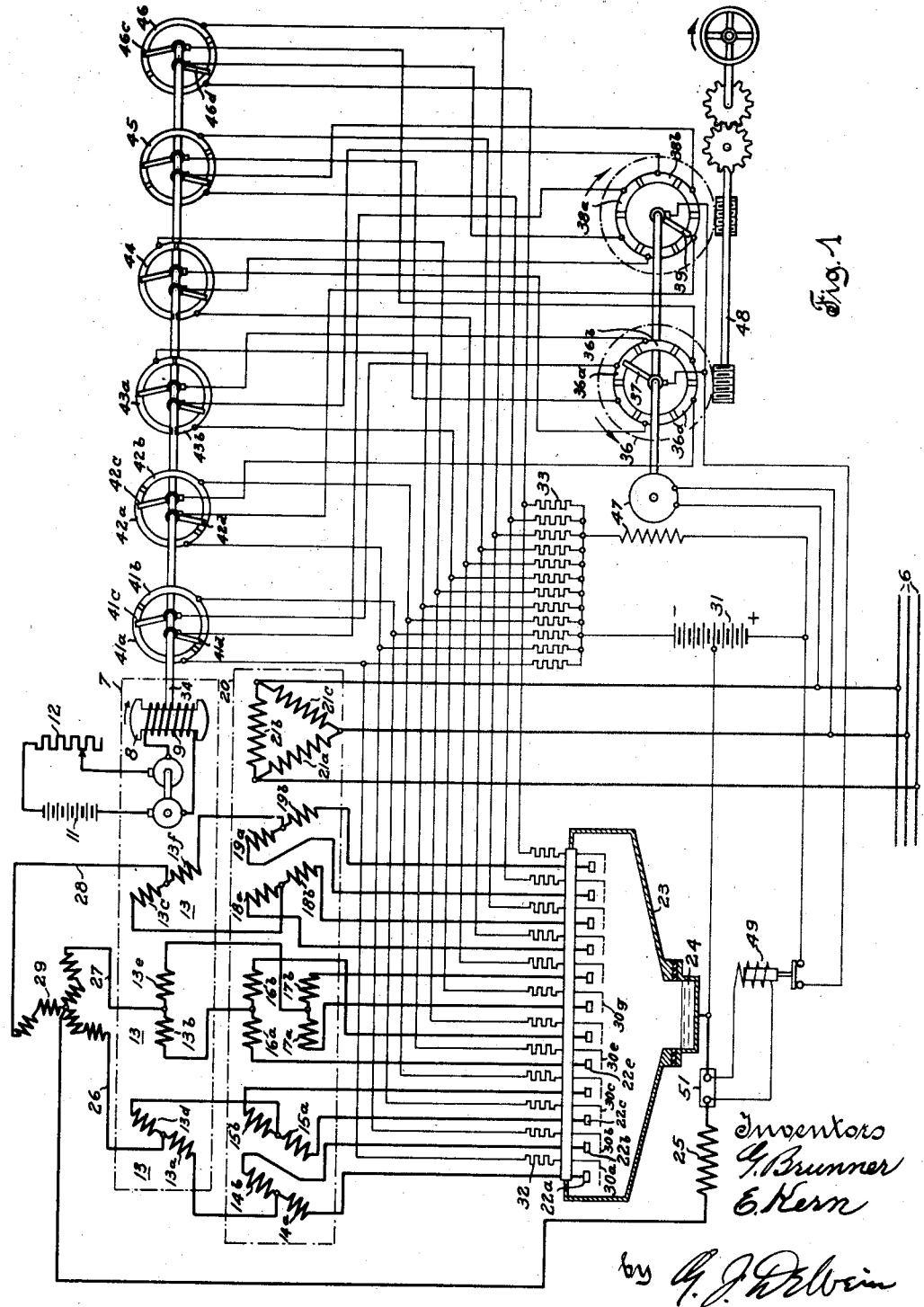

May 7, 1935.　　　G. BRUNNER ET AL　　　2,000,880
MOTOR CONTROL SYSTEM
Filed Nov. 7, 1934　　　2 Sheets-Sheet 2

Inventors
G. Brunner
E. Kern
by
Attorney

Patented May 7, 1935

2,000,880

UNITED STATES PATENT OFFICE 2,000,880

MOTOR CONTROL SYSTEM

Gustav Brunner, Baden, and Erwin Kern, Ennetbaden, Switzerland, assignors to Aktiengesellschaft Brown Boveri & Cie., Baden, Switzerland, a joint-stock company of Switzerland Application November 7, 1934, Serial No. 751,822
In Germany June 3, 1933

13 Claims. (Cl. 172—274)

This invention relates in general to improvements in control systems, and more particularly to the control of a variable speed dynamo electric machine operable either as a motor or as a generator and in which the flow of current is controlled by means of an electric valve.

Dynamo electric machines of the so-called synchronous alternating current type may be operated as motors at continuously variable speed by commutating the armature currents through an electric valve provided with conductivity controlling means to control the operation thereof. The valve is so controlled as to supply periodic current to each of the armature winding portions of the machine, the sequential flow of current through the several winding portions being so controlled as to insure continuous rotation of the motor in the one or in the other direction. To obtain this result the valve should be controlled in dependence upon the angular position of the rotor, and a reversal of the direction of rotation of the machine is obtained either by utilizing separate control means for each direction of rotation, or by separate adjustment of a single control means.

To cause the machine to operate as a generator, the induced voltage of the armature must be greater than the voltage impressed thereon from the source and, as the flow of current generally cannot be reversed through the valve, the flow of current must be released through each armature portion when the impressed and induced voltages thereof are of polarity opposite to the polarity of such voltages during motoring operation of the machine. The flow of energy is thus reversed even though the flow of current is maintained in the same direction. By controlling the valve to simultaneously permit the flow of current through two separate circuits of the machine, the polarity of the impressed and induced voltages of the one circuit being opposite to those of the other circuit, the machine may be made operable as a motor or as a generator in dependence upon the relative magnitudes of the impressed and induced voltages of the armature as in a direct current shunt motor. The induced voltage of the armature generally is proportional to the speed of the machine, which therefore operates as a motor when retarded by the load and operates as a generator when accelerated by the load. The value of the speed at which the machine changes over from motoring operation to generating operation may be varied by adjustment of the control elements of the valve, and the direction of rotation of the machine may be reversed by further adjustment of the control elements.

It is therefore one of the objects of the present invention to provide a control system for a valve controlled dynamo electric machine for obtaining motoring or generating operation of the machine by a single adjustment of the control means of the valve.

Another object of the present invention is to provide a control system for a valve controlled dynamo electric machine providing for the adjustment of the speed of the machine at variable values.

Another object of the present invention is to provide a control system for a valve controlled dynamo electric machine by which motoring or generating operation of the machine is automatically obtained in dependence upon the direction of action of the torque exerted between the machine and the load connected therewith.

Another object of the present invention is to provide a control system for a valve controlled dynamo electric machine by which the reversal of the direction of rotation of the machine may be obtained by adjusting the means controlling the operation of the valve.

Another object of the present invention is to provide a control system for a valve controlled dynamo electric machine in which control means controlling motoring operation of the machine in one direction of rotation controls also generating operation of the machine in the other direction of rotation.

Another object of the present invention is to provide a control system for an electric translating system connecting a polyphase alternating current circuit with another alternating current circuit, by means of which all the phases of the polyphase circuit are substantially equally loaded at every instant.

Another object of the present invention is to provide a control system for an electric translating system including an electric valve connecting a polyphase alternating current circuit with another alternating current circuit by means of which system the flow of energy between the circuits may occur in either direction of flow by a single adjustment of the control means of the valve.

Figure 2:
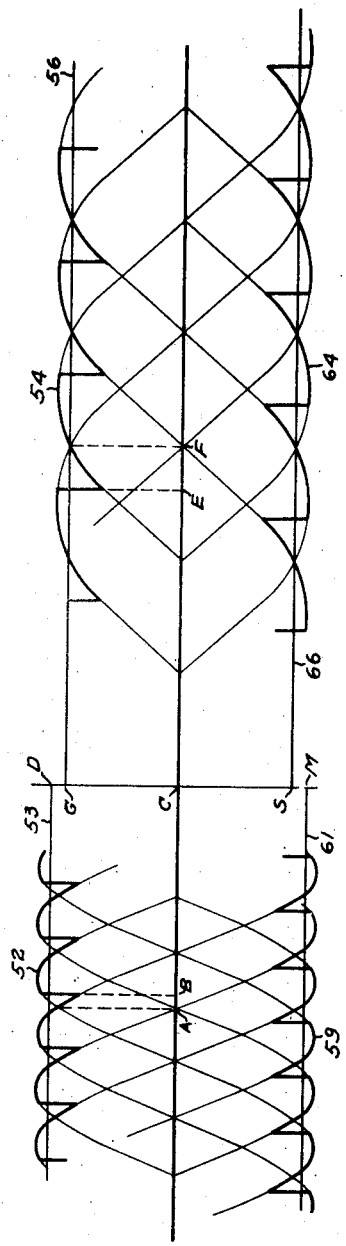
Figure 3:
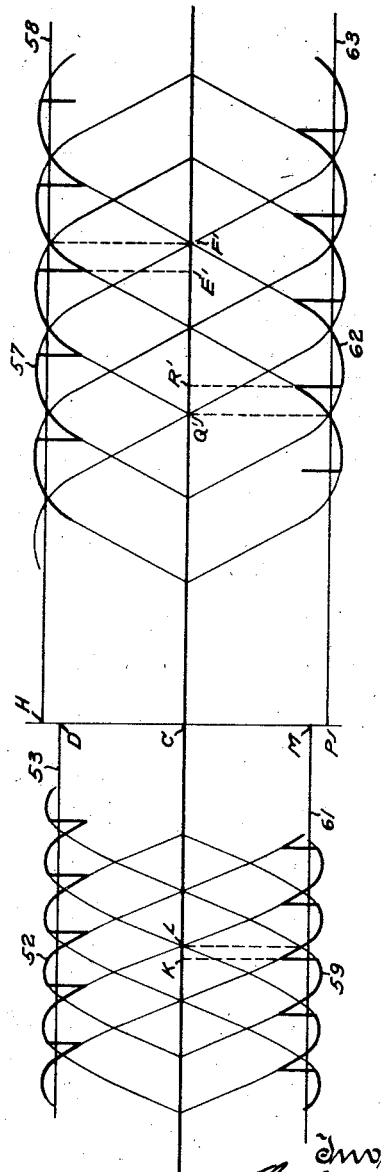

Objects and advantages other than those above described will be apparent from the following description when read in connection with the accompanying drawings, in which:

Fig. 1 diagrammatically illustrates one embodiment of the present invention applied to the control of a variable speed motor supplied from a polyphase alternating current line through an electric valve, to obtain automatic regeneration of the motor when the torque exerted between the motor and the load is reversed and to obtain substantially equal loading of all phases of the supply line under both conditions of operation;

Fig. 2 is a diagram of the impressed and induced voltages of the machine during operation thereof as a motor; and Fig. 3 is a diagram of the impressed and induced voltages of the machine during operation thereof as a generator.

Referring more particularly to the drawings by characters of reference, reference numeral 6 generally designates a polyphase alternating current supply line or circuit connected with suitable generators and with suitable current consuming devices (not shown) so that the line is capable of supplying energy to or absorbing energy from a dynamo electric machine of the so-called synchronous type generally designated at 7. Machine 7 is provided with a field 8 shown as constituting the rotor of the machine, but such field may also constitute the stator thereof, and is provided with an exciting winding 9. Winding 9 is supplied with current at normally constant voltage of adjustable value from a suitable source of direct current such as a battery 11, the flow of current through winding 9 being adjusted by means of a rheostat 12.

Machine 7 is provided with an armature winding 13 divided into a plurality of portions 13a to 13f spaced over the periphery of the armature and connected in pairs to form three neutral points. Each free terminal of winding 13 is connected with the midtap of one of the secondary windings 14 to 19 of a supply transformer generally designated 20 and having a primary winding 21 comprising a plurality of winding portions 21a, 21b and 21c connected with the several phases of line 6. Each of the secondary winding terminals of transformer 20 is connected with one of the anodes 22 of an electric valve 23 herein represented as being of the vapor type having a single cathode 24, but which may be of any other unilateral type having a cathode or a plurality of cathodes. Valve 23 is provided with suitable means for bringing and maintaining cathode 24 in current conductive condition, such means being well known and therefore not shown.

Cathode 24 is connected with the neutral points of winding 13 either directly or through a current smoothing reactor 25. Such connection also preferably includes a paralleling reactor 29 similar in its construction and operation to the so-called interphase transformers utilized in electric current rectifying systems and cooperating with windings 13 and 14 to 19 to define a plurality of paths 26, 27, and 28 for the flow of current through the system, the effect of such reactor or interphase transformer being to cause simultaneous flow of substantially equal currents in all three paths at every instant.

The operation of each anode 22 is controlled by means of an associated control electrode 30 of any suitable type diagrammatically represented as being of the grid type. The control voltages for the control electrodes are obtained from a suitable source, such as a battery 31 having an intermediate tap thereof connected with cathode 14, to thereby establish a definite relation between the potential of cathode 24 taken as datum and the potentials of the control electrodes resulting from the impression of voltages thereon from battery 31. The control electrodes are generally maintained at a negative potential as a result of the connection thereof with the negative terminal of battery 31 through resistors 32 and 33, and are also connected through resistors 32 with the segments of a plurality of distributors 41 to 46, each provided with a pair of segments such as 41a and 41b.

Each distributor is provided with a pair of brushes such as 41c and 41d driven in a predetermined relation to the angular position of the rotor of machine 7 by being mounted on the shaft 34 of the machine, or in any other suitable manner. Brushes 41c to 46c are severally connected with the segments 36a to 36f of a distributor 36 having a brush 37, and brushes 41d to 46d are severally connected with the segments 38a to 38f of another distributor 38 having a brush 39. Brushes 37 and 39 are jointly driven in relation with the voltage of line 6 by means of a synchronous motor 47 energized from the line 6. Each brush 37 and 39 thus engages with each of the associated segments once per cycle, and the moment of engagement of each brush with each segment during the voltage cycle may be advanced or retarded by suitable adjusting means such as a worm drive 48 arranged to simultaneously angularly displace distributor 36 in one direction and distributor 38 in the other direction. Brushes 37 and 39 are connected with the positive terminal of battery 31 through the contacts of a protective relay 49 energized from a shunt 51 connected in series with cathode 24, the purpose of relay 49 being to cause interruption of flow of current through valve 23 upon occurrence of a disturbance such as an overload of the motor or a backfire in valve 23.

In operation, the system being connected as shown, machine 7 will first be assumed to be at standstill in the position shown. All control electrodes 30 are generally maintained at a negative potential from battery 31 and prevent operation of the associated anodes. Motor 47 rotates in synchronism with the voltage of line 6, and brushes 37 and 39 sequentially engage with the associated segments once per cycle of such voltage.

In the position shown for motor 7, control electrode 30a is connected with segment 36a of distributor 36 through segment 41a and brush 41c of distributor 41. Control electrode 30a controls the flow of current through associated anode 22a and through path 26 by way of winding portions 13a and 14a, but such flow of current can only occur when the voltage of winding portion 14a is impressed in the conductive direction of valve 23, i. e. during the half-cycle during which the terminal of winding 14a is positive with respect to the neutral point of winding 14, and the voltage is then considered as being positive. Drive 48 is so adjusted that, during the latter part of the positive half-cycle of the voltage of winding portion 14a, brush 37 engages with segment 36a, thereby causing momentary impression on control electrode 30a of a positive voltage from battery 31 overcoming the negative voltage received from such battery through resistor 33. Control electrode 30a thus releases the flow of current through path 26, through winding portions 13a and 14a, reactor 25 and one of the legs of interphase transformer 29.

After an interval equal to one-sixth of a cycle of the voltage of line 6, brush 37 leaves segment 36a and engages with segment 36b, thereby causing control electrode 30b to be momentarily energized at a positive potential to release the flow of current through path 27, winding portions 13b and 16a, reactor 25 and another leg of interphase transformer 29. Continued rotation of brush 37 causes the sequential release of the flow of current in the manner above described through path 28, winding portions 13c and 18a, and again through path 26, such path now comprising winding portions 13a and 14b, through path 27 comprising winding portions 13b and 16b, and through path 28 comprising winding portions 13c and 18b. Such sequence of operation is repeated during every cycle of the voltage of line 6, the flow of current through the several anodes thus released combining into a flow of direct current between cathode 24 and the neutral point of interphase transformer 29.

It will be observed that each path such as 26 may include either of four winding portions such as 14a, 14b, 15a and 15b all receiving voltage from line 6, but under the present operating conditions we need only consider the voltages resulting in an actual flow of current through the path, for instance path 26 when receiving voltage alternately from winding portions 14a and 14b during each cycle. Each path thus receives, from the associated secondary winding of transformer 20, a full wave rectified single phase voltage, such rectified voltages being impressed on the several paths, in the present embodiment, at intervals equal to sixty degrees of the voltage of line 6 as in the well known six phase electric current rectifying systems. Under such conditions, although the voltages impressed on the associated paths by windings 14, 16 and 18 are of substantially equal average values, the voltages of the different paths are different at every instant. In the absence of interphase transformer 29, current would flow sequentially through winding portions 13a, 13b and 13c, without any material period of overlap between the current in the several windings. As is well known, however, the flow of current through the several legs of an interphase transformer such as 29 causes the appearance in such legs of voltages such as to cause the resulting voltage impressed on all the paths to be substantially equal and of value equal to the average of the voltages of windings 14, 16 and 18. The flow of current then occurs simultaneously through all three paths at every instant, and windings 14, 16 and 18 thus each carry current during the entire cycle.

The arrangement of the windings of transformer 20 is such that substantially equal currents flow in portions 21a, 21b and 21c of winding 21 and result in a substantially uniform loading of all phases of line 6. By this statement is meant that the R. M. S. values of the currents of all phases of line 6 are equal during any cycle of the voltage thereof irrespectively of the position of field 8.

The flow of current through winding portions 13a, 13b and 13c in inductive relation with winding 9 causes a torque to be impressed on field 8 of the machine to cause such field to rotate, for example in the clockwise direction. During such operation, the control electrodes of valve 23 not mentioned above are either continuously negatively energized, or else are momentarily positively energized when the associated portions of winding 15, 17 and 19 are supplying negative voltages which do not result in any flow of current through the system.

Rotation of field 8 and shaft 34 causes brush 41c to leave segment 41a and to engage with segment 41b. Brush 42 likewise leaves the segment 42a and engages with segment 42b. The connection established by distributors 43 to 46 at first remain those already above considered. Under such conditions, the flow of current which previously was released sequentially through winding portions 13a, 13b and 13c is now released sequentially through winding portions 13b, 13c and 13d by a sequence of operation entirely similar to that above considered. Such flow of current causes the torque exerted on field 8 to continue to be exerted in a uniform direction, thereby causing further rotation of the field. During such rotation, the flow of current is sequentially released through the groups of winding portions 13c, 13d, 13e, 13d, 13e, 13f, 13e, 13f and 13a, 13f, 13a and 13b, and 13a and 13b and 13c after a complete revolution of field 8 if the machine is a two-pole machine. Such sequence of operation is repeated during each revolution of the field, and the machine gathers speed provided that the torque exerted on the shaft is sufficient to accelerate the load.

As the machine gathers speed, the rotation of field 8, induces in winding portions 13a to 13f voltages which constitute counter-electromotive forces opposed to the voltages impressed on such winding portion and limiting the flow of current therethrough. As already explained above, windings 14, 16 and 18 simultaneously carry currents which combine at cathode 24 to form a flow of substantially uniform direct current flowing through reactor 25 to the neutral point of interphase transformer 29 in the same manner as if the system were supplying direct current to a load circuit connected between cathode 24 and interphase transformer 29. Such flow of direct current is then inverted into the several portions of winding 13 to form therein alternating currents of frequency dependent on the speed of rotation of machine 7. Such currents are commutated between the several portions of winding 13 by the joint action of the induced voltages of such portions and of the control electrodes of valve 23. It will be understood that winding 13 could also be the winding of a transformer connected with an alternating current circuit, provided that such circuit be connected with a suitable voltage source to supply the counterelectromotive force necessary for commutating current through the portions of winding 13 as in direct current inverting systems known in the art.

As already explained above, the action of interphase transformer 29 results in making the output voltage of transformer 20 effective to cause the flow of current through winding 13 equal to the average of the three rectified voltages of windings 14, 16 and 18. This voltage is then represented by a curve which is not constituted of portions of the individual sine wave phase voltages of such winding, but is constituted instead of portions of phase voltages of lesser magnitude and of the same frequency, and may be represented by curve 52 in Fig. 2. In drawing curve 52 the effect of the overlap between the operations of commutating anodes on the voltage was neglected, such effect not introducing any material change in the operation of the system. Curve 52 will consist of successive peaks of sine waves comprised between the intersections thereof if the engagement of brush 37 with the segment of distributor 36 is advanced to the maximum possible extent, and the voltage impressed by transformer 28 on winding 13 is then at a maximum value. In general however, the energization of the control electrodes is retarded during the voltage cycle of line 6 by a variable time interval, and curve 52 accordingly consists of portions of sine waves displaced with respect to the peak portions of the waves by a time interval equal to the time delay given to the energization of the control electrodes and represented by distance AB in Fig. 2. In valves of the vapor type in which the flow of current may be released but may not be interrupted by the action of the control electrodes, it is only possible to delay the flow of current through the several anodes to thereby commutate the flow of current from one anode at a lower voltage to another anode at the higher voltage upon release of the flow of current therethrough. If the control electrodes are given certain dimensions however, or if the valve is of the high vacuum type, the flow of current through each anode may be interrupted at will, so that commutation between anodes does not depend upon the relative voltages of such anodes and the flow of current therethrough may be advanced at will as well as retarded.

It will be observed that the voltage represented by curve 52 is not uniform but presents a direct current component equal to the average value thereof and which may be represented by line 53 of ordinate CD and also an alternating current component, but the inductance of the circuit is usually such that the alternating component does not materially affect the flow of the current through the circuit so that it may be disregarded, and line 53 may be considered instead of curve 52. During rotation of field 8, the voltage induced in each portion of winding 13 is sinusoidal, but is utilized to limit the flow of current therethrough only during the periods of time during which the flow of current is released by the associated control electrodes through the particular circuit in which such portion is connected. As a result of the rectifying action of valve 23, the induced voltages of the several winding portions are effective only in one direction of flow of current and combine to form a unidirectional voltage opposed to the unidirectional voltage impressed on the motor and represented by curve 52 or line 53, as in a direct current inverting system.

As a result of the action of interphase transformer 29, such voltage is not represented by successive portions of the sine waves representing the voltages of the several portions 13a to 13f, but is represented by successive portions of sine waves of lesser magnitude. Such voltage may then be represented by curve 54 neglecting the effect of overlap during commutation between winding portions; in general, the flow of current through each winding portion is released by means of a control electrode a short time before the induced voltage of such portion passes from negative value to positive value to thereby cause commutation between successive winding portions, the flow of current tending to occur through the winding opposing the least positive voltage or even having a negative voltage to the impressed voltage. Curve 54 accordingly consists of portions of sine waves advanced with respect to the peak portions thereof, comprised between curve intersections, by a time interval EF equal to the time interval between the release of the flow of current through a winding portion and the subsequent passage of the induced voltage thereof to zero. Such curve of induced voltage presents a unidirectional component represented by line 56 of ordinate CG, and an alternating component which may be disregarded as the inductance of the circuit will generally prevent such alternating component from materially affecting the flow of current therethrough.

Irrespectively of whether the machine is operating as a motor or as a generator, the induced voltage of winding 13 is substantially proportional to the speed of rotation of the motor and, during motoring operation of the machine, the speed thereof will increase until a speed is reached for which the induced voltage represented by ordinate CG is slightly less than the impressed voltage represented by ordinate CD. Ordinate DG then represents the net voltage impressed on paths 26, 27 and 28 in the direction of conductivity of valve 23, and resulting in a flow of current of magnitude such that the resistance and reactive voltage drops in the circuit add up to the value DG.

As the induced voltage of the machine is substantially constant for any given value of the impressed voltage, the speed of the machine may be varied by varying the relation between the speed and the value of the induced voltage. Such result may be obtained by varying the adjustment of brushes 41c to 46c to vary the time interval EF or by varying the excitation of winding 9 by means of rheostat 12. It is however preferred to vary the value of the impressed voltage by changing the adjustment of distributors 36 and 38. Such change of adjustment causes the time interval AB to be varied, whereby the impressed voltage of the machine may be gradually varied between a maximum value and zero.

Assuming the machine to operate as a motor under the condition diagrammatically illustrated in Fig. 2, if the load tends to accelerate the motor instead of being driven thereby, the speed of the motor will increase in the same direction of rotation. Such change in the operating conditions does not affect the impressed voltage which is again represented by curve 52 or line 53 in Fig. 3. The induced voltage of the machine however, which is proportional to the speed of the machine, is then represented by portions of sine waves of increased magnitude and higher frequency. The induced voltage of the machine may then be represented by curve 57 in Fig. 3, such curve being constituted of portions of sine waves corresponding to the portions utilized in curve 64, such portions being displaced from the peak portions of the waves by a time interval E'F' corresponding to the same angular displacement of the field 8 as interval EF in Fig. 2. Curve 57 may be disregarded in favor of line 58 of ordinate CH, representing the unidirectional component thereof. Under such conditions the net voltage impressed on paths 26, 27 and 28 to cause the flow of current therethrough is represented by ordinate DH, such voltage being however impressed in a direction opposite to the conductive direction of valve 23 and therefore not resulting in any flow of current through the system. The machine therefore no longer operates as a motor but, as will be shown hereinafter, it then operates as a generator, the flow of current therethrough being controlled by distributors 38 and brushes 41d to 46d.

To simplify the explanation of the operation of the system, it will be assumed that current is already flowing through the system to return energy to line 6 so that interphase transformer 29 is operating to cause the impressed and induced voltages to have equal values in all three paths 26, 27 and 28. The motor will be considered as rotating and as being momentarily in the position illustrated in the drawings. The adjustment of distributor 38 by means of worm drive 48 is then such that, during the negative half cycle of the voltage of winding portion 15a, brush 39 engages with segment 38a to momentarily impress a positive voltage of control electrode 30b through segment 38a, brush 41d and segment 41c. After a time interval equal to one-sixth of a cycle of the voltage of line 6, brush 39 engages with segment 38b whereby a positive voltage is momentarily impressed on control electrode 30g, brush 39 sequentially engaging with the several segments of distributor 38 for sequentially releasing the flow of current through winding portions 15a, 17a, 18a, 15b, 17b and 19b in a manner similar to that above described for windings 14, 16 and 18.

The voltages of winding 15, 17 and 19 impressed on paths 26, 27 and 28 are averaged by the action of interphase transformer so that the several paths receive identical voltages which may be represented by curve 59 comprising portions of sine waves of magnitude less than the magnitude of the voltages of the portions of windings 15, 17 and 19, and of the same frequency. Distributor 38 is so adjusted that the flow of current through each portion of windings 15, 17 and 19 occurs during intervals in advance of the peak portions of the voltage waves comprised between intersections to cause commutation between successive windings, current passing from a winding of high negative voltage to a portion of lower negative voltage for the reason that line 6 no longer acts as a source but acts as a load in which current is commutated in the same manner as current is commutated in winding 13 during motoring operation of the machine. The portions of the curves utilized are displaced with respect to the peak portions thereof by a time interval KL which is preferably equal to interval AB but which may also be of different value. If intervals AB and KL are equal, the ordinate CM of line 61 representing the unidirectional component of curve 59 is equal to ordinate CD of line 53.

The control electrodes are energized in a sequence such that the voltage represented by curve 59 is impressed on winding portion 13d, 13e and 13f when the motor is in the position shown. During rotation of the machine, brushes 41b to 46b cooperate with distributor 38 to cause the voltage to be always impressed on the particular portions of winding 13 which are not utilized when field 8 is in the same position during motoring operation of the machine. The control electrodes are also so controlled that the induced voltage of such portions of winding 13 is impressed on paths 26, 27 and 28 when such voltage is negative, so that such voltage is no longer represented by curve 57 but by a curve 62 consisting of portions of sine waves retarded with respect to the peak portions thereof by a time interval Q'R' which is preferably made equal to E'F'. If such intervals are equal the unidirectional component of curve 62 may be represented by a line 63 of ordinate CP equal and opposite to ordinate CH. The impressed and induced voltages present in paths 26, 27 and 28 being opposed to each other, the voltage effective to cause flow of current through the system is equal to the difference therebetween and is represented by ordinate MP, such voltage being impressed on the circuit in the direction of conductivity of valve 23. Machine 7 then operates as a generator and supplies energy to line 6, such reversal of the flow of energy being effected by reversing the polarities of the impressed and induced voltages of the machine whereby the direction of flow of current need not be reversed. Windings 15, 17 and 19 carry current simultaneously at every instant as a result of the action of interphase transformer 29, so that all phases of line 6 are loaded with currents of substantially equal R. M. S. values at every instant as during motoring operation of machine 7.

During motoring operation of the machine considered above, distributor 38 and brushes 41d and 46d also cooperate to impress on the motor a voltage represented by curve 59 in Fig. 2 and to oppose to such voltage an induced voltage represented by a curve 64 having a unidirectional component 66 of ordinate CS equal to ordinate CD. The resulting voltage in the circuit in which such voltages are present is then represented by ordinate SM, but such voltage is impressed in a direction opposite to the conductive direction of valve 23 so that such voltage is without effect during motoring operation of the machine, for the same reason that the voltage represented by ordinate DH is without effect during generating operation of the machine. It will now be apparent that it is not necessary that ordinates CM and CD be equal nor that ordinates CS and CG be equal, the only condition being that the voltages represented by ordinates DG and SM be of signs and magnitudes such as not to be simultaneously effective in the conductive direction of valve 23 to cause discordant flows of current therethrough. If ordinate GD is smaller than ordinate SM, motoring operation of the machine will occur at a lower speed than the speed at which generating operation is initiated.

When distributor 36 is adjusted to retard the release of the flow of current through the anodes of valve 23 during motoring operation, distributor 38 is simultaneously moved to advance the release of the flow of current through the anodes during generating operation so that the voltages represented by curves 52 and 61 simultaneously decrease to a corresponding extent and the machine may always be operated either as a motor or as a generator, but the speed at which the changeover from motoring to generating operation occurs will be decreased to an extent corresponding to the decrease of the value of the impressed voltage. Distributors 36 and 38 may be moved to such an extent that the average impressed voltage is equal to zero, and the motor then remains at standstill. Continued movement of distributors 36 and 38 in the same direction causes the impressed voltage to be so applied to winding 13 that the direction of rotation of the machine is reversed, voltage 53 becoming negative and voltage 61 becoming positive. Distributor 38 cooperates with brushes 41 to 46d to control the motoring operation of the machine and distributor 36 cooperates with brushes 41c to 46c to control the generating operation of the machine. The operation is otherwise entirely similar to that above described and a detailed consideration thereof is therefore not necessary.

The operation of machine 7 depends upon the relative values of the impressed and induced voltages of the machine, valve 23 being invariably connected with the machine and with line 6 for controlling the flow of energy therebetween. Line 6 constitutes a polyphase alternating current circuit and winding 13 constitutes another alternating current circuit, the flow of current energy between such circuits being controlled by valve 23. Winding 13 comprises a plurality of parallel paths equal in number to the number of phases of line 6, transformer 20 individually linking each of the paths with one phase of the line. The operation of valve 23 is controlled by means causing a substantially equal loading of all phases at line 6 at every instant. The means for controlling the operation of the valve comprises paralleling reactor or interphase transformer 29 which causes simultaneous flow of current through all paths and through the anodes of the valve connected therein, and comprises further means for controlling the conductivity of valve 23 including control electrodes 30, distributors 41 to 46 and distributors 36 and 38, with source 31. Distributors 36 and 38 are actuated in relation to the voltage cycle of line 6 for controlling the conductivity of valve 23; distributors 41 to 46 operate in relation with the angular position of the machine and cooperate with distributors 36 and 38 to effectively control the flow of energy in either direction between line 6 and winding 13. Such control is obtained by a single adjustment of the distributors, whereby the direction of the flow of energy between line 6 and winding 13 is determined by the relative values of their voltages. One of the distributors 36 and 38 cooperate with one-half of the brushes of distributors 41 and 46 to control the flow of energy during motoring operation of the machine, the others of distributors 36 and 38 and the remainder of the brushes of distributors 41 and 46 cooperating to control the flow of energy during generating operation of the machine in the same direction of rotation. Brushes 41c to 46c are adapted to control the conductivity of valve 23 to control the flow of current to winding 13 during motoring operation of machine 7 in one direction of rotation, distributor 36 operating in synchronism with the voltage of line 6 and cooperating with brushes 41c to 46c to regulate the flow of current through winding 13. Brushes 41d to 46d are adapted to control the conductivity of valve 23 to control the flow of current through winding 13 during motoring operation of the machine in the other direction of rotation, distributor 38 operating in synchronism with the voltage of line 6 and cooperating in brushes 41d to 46d to regulate the flow of current through winding 13 during generating operation of the motor in the first mentioned direction of rotation. Rheostat 12 is used to vary the relation between the speed of field 8 and the induced voltage of the machine. Worm gear 48 controls the conductivity controlling means of valve 23 for varying the effective values of the voltage impressed on the machine from line 6, and oppositely varies the adjustment of distributors 36 and 38 to vary both the operating speed and the direction of rotation of the machine.

Although but one embodiment of the present invention has been illustrated and described it will be apparent to those skilled in the art that various changes and modifications may be made therein without departing from the spirit of the invention or from the scope of the appended claims.

It is claimed and desired to secure by Letters Patent:

1. In a control system, an electric current supply line, a dynamo electric machine operable as a motor or as a generator in dependence upon the relative values of the impressed and induced voltages of said machine, electric valve means connected with said machine and with said line for controlling the flow of energy therebetween, and means for controlling the conductivity of said valve means and effective to control the said flow of energy in either direction of flow by a single adjustment of the controlling means.

2. In a control system, an electric current supply line, a dynamo electric machine, an electric valve invariably connected with said machine and with said line for controlling the flow of energy therebetween, means for controlling the conductivity of said valve effective to control the said flow of energy during motoring operation of said machine, and means for controlling the conductivity of said valve effective to control the said flow of energy during generating operation of said machine, the direction of flow of energy between said machine and said line being determined by the relative values of the impressed and induced voltages of said machine.

3. In a control system, an electric current supply line, a dynamo electric machine, an electric valve connected with said machine and with said line for controlling the flow of energy therebetween, means for controlling the conductivity of said valve effective to control the said flow of energy during motoring operation of said machine, means for controlling the conductivity of said valve effective to control the said flow of energy during generating operation of said machine, the direction of flow of energy between said machine and said line being determined by the relative values of the impressed and induced voltages of said machine, and means for varying the relation between the speed and the induced voltage of said machine.

4. In a control system, an electric current supply line, a dynamo electric machine, an electric valve connected with said machine and with said line for controlling the flow of energy therebetween, means for controlling the conductivity of said valve and effective to control the said flow of energy during motoring operation of said machine, means for controlling the conductivity of said valve and effective to control the said flow of energy during generating operation of said machine the direction of flow of energy between said machine and said line being determined by the relative values of the impressed and induced voltages of said machine, and means for controlling the first and second said means for varying the effective value of the voltage impressed on said machine from said line.

5. In an electric current converting system, a first alternating current circuit, a second alternating current circuit, an electric valve connected with said circuits for controlling the flow of electrical energy therebetween, means operating in relation with the voltage cycle of the second said circuit for controlling the conductivity of said valve, and means operating in relation with the voltage cycle of the first said circuit and cooperating with the first said means to effectively control the flow of energy in either direction of flow between said circuit by a single adjustment of the first and second said means, the direction of flow of energy between said circuits being determined by the relative values of the voltages of said circuits.

6. In a control system, an alternating current supply line, a transformer connected with said line, a dynamo electric machine having an armature winding connected with said transformer, an electric valve connected with said transformer and with said winding for controlling the flow of current therebetween, means actuated by said machine adapted to control the conductivity of said valve to control the flow of current through said winding during motoring operation of said machine in one direction of rotation, means actuated by said machine adapted to control the conductivity of said valve to control the flow of current through said winding during motoring operation of said machine in the other direction of rotation, means actuated in synchronism with the voltage of said line and cooperating with the first said means to regulate the flow of current through said winding during operation of said machine as a motor in the said one direction of rotation, and means actuated in synchronism with the voltage of said line and cooperating with the second said means to regulate the flow of current through said winding during operation of said machine as a generator in the said one direction of rotation.

7. In a control system, an alternating current supply line, a transformer connected with said line, a dynamo electric machine having an armature winding connected with said transformer, an electric valve connected with said transformer and with said winding for controlling the flow of current therebetween and having a plurality of anodes with associated control electrodes, a source of control voltages for said control electrodes, means for normally impressing on said control electrodes voltage from said source of sign and magnitude effective to prevent operation of the associated anodes, means actuated by said machine for sequentially impressing on said control electrodes voltage from said source of sign and magnitude effective to sequentially release the flow of current through said anodes to cause operation of said machine as a motor in one direction of rotation, means actuated by said machine for sequentially impressing on said control electrodes voltage from said source of sign and magnitude effective to sequentially release the flow of current through said anodes to cause operation of said machine in the other direction of rotation, means actuated in synchronism with the voltage of said line and cooperating with the first said means to regulate the flow of current through said winding during operation of said machine as a motor in the said one direction of rotation, and means actuated in synchronism with the voltage of said line and cooperating with the second said means to regulate the flow of current through said winding during operation of said machine as a generator in the said one direction of rotation.

8. In a control system, an alternating current supply line, a transformer connected with said line, a dynamo electric machine having an armature winding connected with said transformer, an electric valve connected with said transformer and with said winding for controlling the flow of current therebetween and having a plurality of anodes with associated control electrodes, a source of control voltages for said control electrodes, means for normally impressing on said control electrodes voltage from said source of sign and magnitude effective to prevent operation of the associated anodes, means actuated by said machine for sequentially impressing on said control electrodes voltage from said source of sign and magnitude to sequentially release the flow of current through said anodes to cause operation of said machine as a motor in one direction of rotation, means actuated by said machine for sequentially impressing on said control electrodes voltage from said source of sign and magnitude effective to sequentially release the flow of current through said anodes to cause operation of said machine in the other direction of rotation, means actuated in synchronism with the voltage of said line and cooperating with the first said means to regulate the flow of current through said winding during operation of said machine as a motor in the said one direction of rotation, means actuated in synchronism with the voltage of said line and cooperating with the second said means to regulate the flow of current through said winding during operation of said machine as a generator in the said one direction of rotation, and means for oppositely varying the adjustment of the third and fourth said means to vary both operating speed and the direction of rotation of said machine.

9. In combination, a polyphase alternating current supply circuit, a dynamo electric machine operable as a motor and operable as an electric current generator comprising a winding divided into sections arranged and connected to form a plurality of parallel paths equal in number to the number of phases of said circuit, means linking the said winding sections forming each said path with a different phase of said circuit, electric valve means included in the connections of each said winding section for controlling the flow of current therethrough during operation of said machine as a motor and during operation thereof as a generator, means actuated by said machine during each said operation thereof for controlling the conductivity of said valve means, and means interlinking the said winding sections to cause current to flow simultaneously through each said path at every instant during each said operation of said machine.

10. In combination, a polyphase alternating current supply circuit, a dynamo electric machine operable as a motor and operable as an electric current generator comprising a winding divided into a plurality of sections arranged and connected to form a plurality of groups equal in number to the number of phases of said circuit, means linking each said group of winding sections with a different phase of said circuit, electric valve means included in the connections of said winding sections for controlling the flow of current therethrough, means actuated by said machine during each said operation thereof for controlling the conductivity of said valve means, and means interlinking said winding sections to cause current to flow simultaneously through a winding section of each said group thereof at every instant.

11. In combination, a polyphase alternating current supply circuit, a dynamo electric machine operable as a motor in one and another direction of rotation and operable as a generator in the said one and another direction comprising a winding divided into sections to form a plurality of paths equal in number to the number of phases of said circuit, means linking the said winding sections forming each said path with a different phase of said circuit, electric valve means included in the connections of each said winding section for controlling the flow of current therethrough during each said operation of said machine, means actuated by said machine during each said operation thereof for controlling the conductivity of said valve means, and means interlinking the said winding sections to cause current to flow simultaneously through each said path at every instant during each said operation of said machine.

12. In combination, a polyphase alternating current supply circuit, a dynamo electric machine operable as a motor and operable as an electric current generator comprising a winding divided into sections arranged and connected to form a plurality of parallel paths equal in number to the number of phases of said circuit, means linking the said winding sections forming each said path with a different phase of said circuit, electric valve means included in the connections of each said winding section for controlling the flow of current therethrough during each said operation of said machine, means actuated by said machine for controlling the conductivity of said valve means, and means actuated in synchronism with the voltage of said circuit and cooperating with the third said means to regulate the flow of current through said winding sections during each said operation of said machine.

13. In combination, a polyphase alternating current circuit, a dynamo electric machine operable as a motor and operable as an electric current generator comprising a winding arranged and connected to form a plurality of parallel paths equal in number to the number of phases of said circuit, means linking the said winding sections forming each said path with a different phase of said circuit, electric valve means included in the connections of each section controlling the flow of current therethrough during each said operation of said machine, means actuated by said machine during each said operation thereof for controlling the conductivity of said valve means, means actuated in synchronism with the voltage of said circuit and cooperating with the third said means to regulate the flow of current through said winding sections during each said operation of said machine, and means interlinking each of said winding sections to cause current to flow simultaneously through each said path at every instant during each said operation of said machine.

GUSTAV BRUNNER.
ERWIN KERN.